HIGH-POWER AMPLIFIER SYSTEMS

Filed July 12, 1965 3 Sheets-Sheet 2

3,384,833

HIGH-POWER AMPLIFIER SYSTEMS

James J. Hitt, Willow Grove, Pa., assignor to Leeds & Northrup Company, a corporation of Pennsylvania Filed July 12, 1965, Ser. No. 471,165
9 Claims. (Cl. 330—9)

This invention relates to high-power amplifier systems responsive to DC error-signals to deliver power to load means such as the rebalancing motor of follower-up or servo systems, and particularly concerns minimization of power-dissipation in such amplifiers.

In accordance with the present invention, the power output stage is excited by pulses whose amplitude or height is dependent upon the magnitude of the error-signal and whose frequency or duration is also dependent upon the magnitude of the error-signal. The power-dissipation in the output stage is thus minimized for all levels, including zero, of the error-signal.

More particularly, in accordance with the preesnt invention, each of two channels of the power output stage is selectively excited in dependence upon the polarity of the error-signal by pulses whose magnitude or height is dependent upon the magnitude of the error-signal and whose frequency or duration is also dependent upon the magnitude of the error-signal.

More particularly, the DC error-signal is routed, as by a differential amplifier, to one input circuit of one or the other of two AND-gates in dependence upon the polarity of the error-signal. The error-signal is also applied to control a pulse generator whose output pulses, of controlled frequency or width, are applied to the other input of both of the AND-gates so to vary the ON-OFF time ratio of the selected AND-gate as a function of the magnitude of the error-signal. The output pulses from the selected AND-gate, modulated both as to amplitude and frequency or duration, are transmitted, as via a driver amplifier, to the corresponding channel of the output stage of the power amplifier.

Further in accordance with the invention, as utilized in a self-balancing recorder for example, the error-signal, as applied to control the pulse generator, is transmitted by an OR-gate including an RC network which reduces the frequency or width of the pulses when the rebalancing motor is stalled, as by engagement of the rebalancing mechanism with a stop at the corresponding limit of its travel. The OR-gate also includes diodes for discharging the capacitor of the protective RC network when the error-signal next reverses its polarity so to insure rapid movement of the motor-driven mechanism away from the stop to a new position of balance.

The invention further resides in power amplifier systems having features of novelty and utility hereinafter described and claimed.

For a more detailed understanding of the invention, reference is made to the following description of systems embodying it and to the attached drawings in which.

Figure 1:
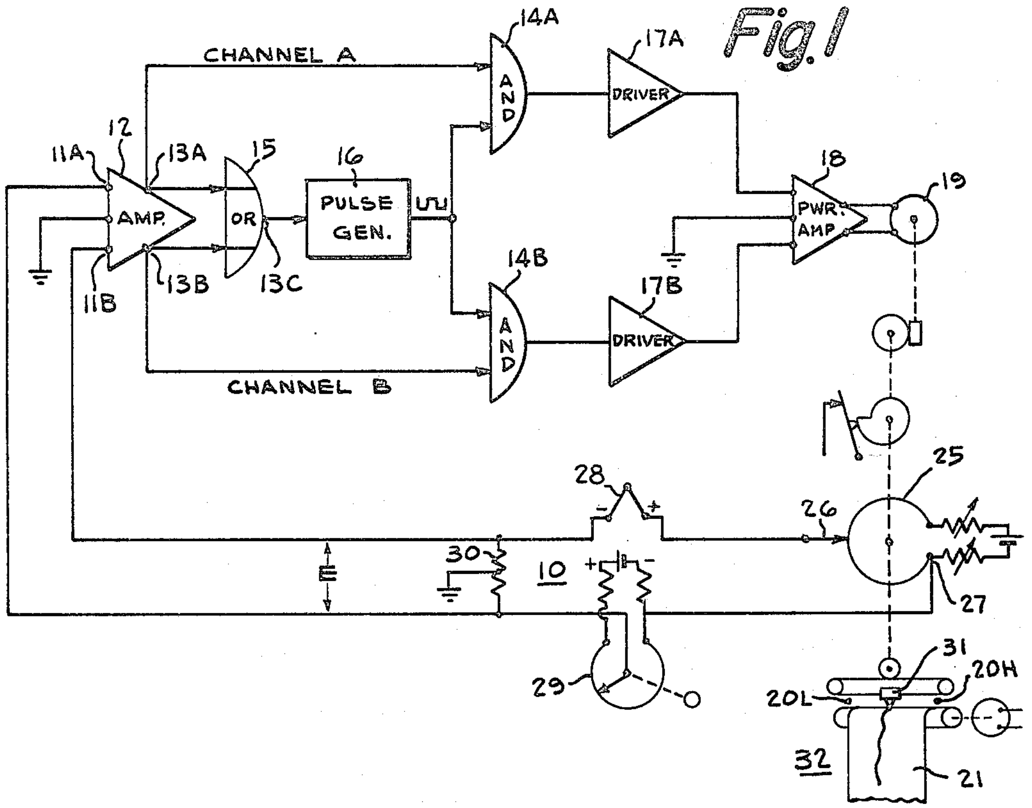
FIG. 1 is a block diagram of the novel DC amplifier and an associated balanceable network.
Figure 4:
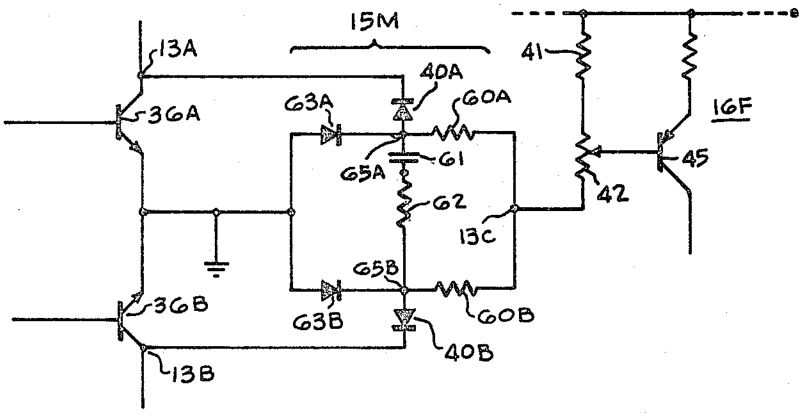
Figures 2, 3:
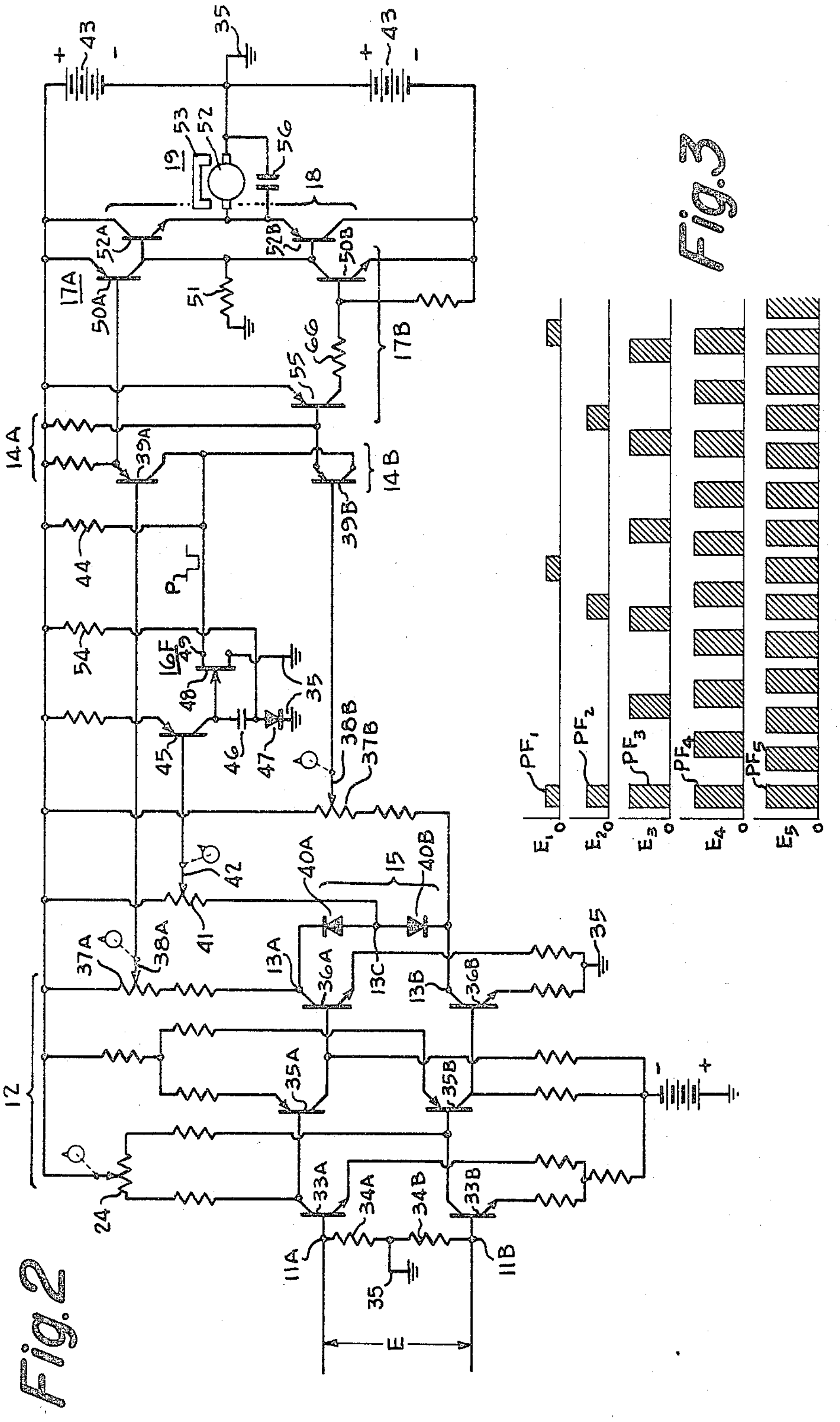
FIG. 2 is a circuit schematic of one species of the invention in which the pulse generator of FIG. 1 produces a frequency-modulated pulse output.
FIG. 3 is an explanatory figure referred to in discussion of FIGS. 1 and 2.
Figures 5, 6:
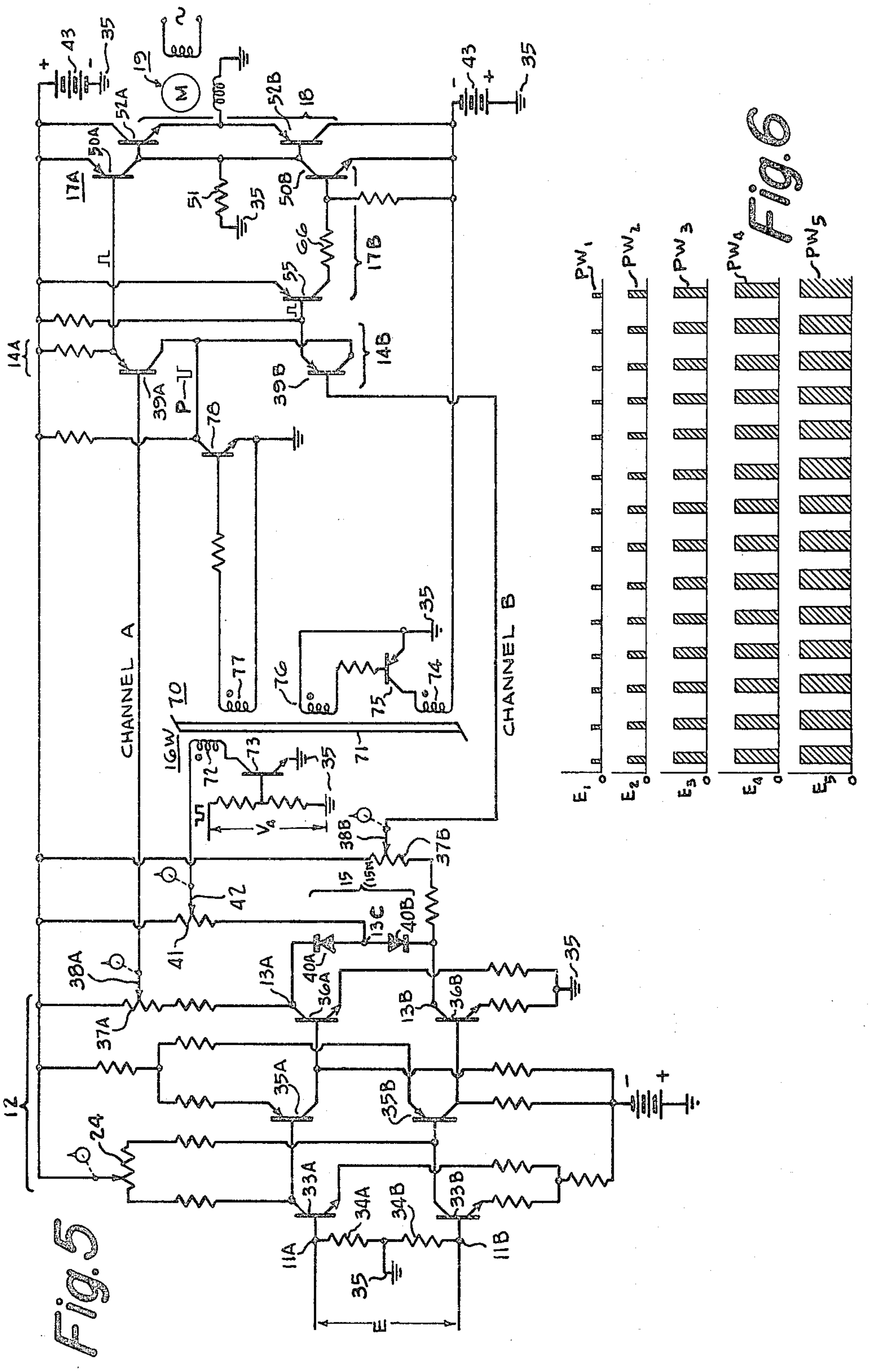

FIG. 4 schematically illustrates a modification of OR-gate circuitry shown in FIGS. 2 and 5;

FIG. 5 is a circuit schematic of another species of the invention in which the pulse generator of FIG. 1 produces a width-modulated pulse output; and FIG. 6 is an explanatory figure referred to in discussion of FIGS. 1 and 5.

In the system of FIG. 1, an error-signal E in sense and magnitude corresponding with the sense and extent of unbalance of a rebalanceable network 10 is applied to the input terminals 11A, 11B of differential amplifier 12 to produce an output of desired polarity on one or the other of the amplifier output terminals 13A, 13B, depending upon the polarity of the error-signal. The amplifier output appearing at terminal 13A is applied to one input terminal of the AND-gate 14A and is also applied via OR-gate 15 to the input terminal of pulse generator 16. The amplifier output as and when appearing at terminal 13B is applied to one input terminal of the AND-gate 14B and is also applied via OR-gate 15 to the input terminal of pulse generator 16. The output pulses of generator 16 are applied to the second input terminals of both of the AND-gates 14A, 14B.

The output pulses produced by generator 16 may be of frequency which varies in accordance with the magnitude of the applied input signal, or may be of duration which varies in accordance with the magnitude of the applied input signal. In other words, the output pulses of generator 16 may be frequency-modulated (PFM) or width-modulated (PWM) by the error-signal output of amplifier 12.

Thus, when an output signal exists at output terminal 13A of amplifier 12, the driver amplifier 17A is excited by pulses from AND-gate 14A. The amplitude of such pulses depends upon the magnitude of the error-signal (FIGS. 3, 6) and either the frequency (FIG. 3) or the duration (FIG. 6) of such pulses also depends upon the magnitude of the error-signal. The output of driver amplifier 17, as applied to the power amplifier 18, is effective to provide pulse excitation for the rebalancing motor 19 of balanceable network 10, the polarity of such pulses being in proper sense to restore balance of the network.

In similar manner, when an error-signal output exists at output terminal 13B of amplifier 12, rebalancing motor 19 is exited for rotation in opposite direction by output pulses of AND-gate 14B as transmitted to the other channel of amplifier 18 via drive 17B. In this case also, the amplitude of the motor-excitation pulses depends upon the magnitude of the error-signal applied to one input of the AND-gate and the frequency or duration of such motor-excitation pulses is determined by the output of pulse generator 16 as applied to the other input of the selected AND-gate.

Accordingly, upon and during existence of an error-signal E of either polarity, the rebalancing motor 19 is energized to run in proper direction to restore balance and at a speed dependent upon the extent of unbalance. Such result has been obtained in prior rebalancing systems, but it is here significant that for all levels of the error-signal the amplifier 18 is not required to dissipate substantial amounts of power. At high levels of error-signal, the active power stage in fully-ON state for a long-duty cycle; at somewhat lower levels of error-signal, the active power stage is in fully-ON state but for a shorter duty cycle; at still lower levels of error-signal, the active power stage is partially ON for a still shorter duty cycle.

At preseected minimum level of error-signal, both channels of the power amplifier 18 are completely OFF because, although pulse generator 16 may still apply pulses to one input of an AND-gate, the error-signal applied to the other input circuit thereof is below threshold level. This establises a narrow deadband within which both output channels of the power amplifier are completely OFF for subminimal error-signals of either polarity.

In FIG. 1, the rebalanceable network 10 is one of the known potentiometer types. The adjustable element of the balancing slidewire 25 (i.e., either the sildewire or its relatively adjustable contact 26) is mechanically coupled to the rebalancing motor 19 to maintain balance between the voltage across the active section of the slidewire (i.e., between contact 26 and terminal 27) and the sum of the voltages across the transducer 28 and the setpoint slidewire 29. When network 10 is not in balance, the unbalanced current flow through resistor 30 produces the error-voltage E. In this type of balanceable network, the motor 19 may also be coupled to the marking element 31 of a recorder or recorder-controller 32. It will be understood the invention is also applicable to other follow-up or servo systems in which motor 19 is used to reposition a control element in response to an error-signal.

In the system in detail shown in FIG. 2, the amplifier 12 has three differential stages. The first stage comprises the NPN transistors 33A, 33B whose bases are connected respectively to input terminals 11A, 11B of the amplifier and via resistors 34A, 34B to a ground or reference point 35. The second stage of amplifier 12 comprises the PNP transistors 35A, 35B whose bases are connected respectively to the collectors of the first-stage transistors 33A, 33B. The third differential stage of amplifier 12 comprises the NPN transistors 36A, 36B whose bases are connected respectively to the collectors of the second stage transistors 35A, 35B. The potentiometer 24 may be provided for balancing adjustment of the gain of the two channels of amplifier 12.

The output or collector circuit of third stage transistor 36A may include a potentiometer resistor 37A whose adjustable contact 38A may be set to apply a desired percentage of the error-signal, as amplified in the A-channel of amplifier 12, to the base of transistor 39A of AND-gate 14A. Similarly, the output or collector-emitter circuit of the other stage transistor 36B may include a potentiometer resistor 37B whose contact 38B may be set to apply a desired percentage of the error-signal as amplified in the B-channel of amplifier A to the base of transistor 39B of AND-gate 14B.

A pair of diodes 40A, 40B connected back-to-back across the output terminals 13A, 13B to amplifier 12 provides the OR-gate 15 having output terminal 13C. The output circuit of the OR-gate 15 may include the potentiometer resistor 41 whose contact 42 may be set to apply a desired percentage of the error-signal as amplified in either the A or B-channels of amplifier 12 to the base of transistor 45 in the pulse generator 16F.

The collector of the current-stage transistor 45 is connected to ground via the capacitor 46 and the biased diode 47 and is also connected to the emitter of the unijunction transistor 48. The network comprising transistors 45, 48, capacitor 46, diode 47 and resistors 44, 54 forms a free-running oscillator which generates pulses of fixed duration or width. The pulse width is predetermined by the chosen magnitude of resistor 54 and is preselected to insure a definite incremental movement of the motor 19 for the smallest pulse passed by either AND-gate 14A, 14B.

The repetition frequency of the generated pulses varies with the magnitude of the error-signal applied to the base of transistor 45. This transistor provides a source of charging current for capacitor 46, the current being constant for a given base voltage of transistor 45. When the voltage across capacitor 46 rises to the firing level of the emitter voltage of unijunction transistor 48, the capacitor 46 discharges to produce a pulse P on the output line of the unijunction oscillator. Specifically, when either channel A or B of amplifier 12 produces an output error-signal, the base voltage of transistor 45 falls to a new value with resulting increase of the charging current supplied via transistor 45 to the capacitor 46 in the frequency-determining circuit of the unijunction oscillator. In consequence, the frequency or repetition rate of the fixed-width, fixed-amplitude pulses generated by oscillator 16F increases in accordance with the amplitude of the error-signal.

The output pulses P of generator 16F, as appearing at the unijunction terminal 49, art negative-going pulses and are applied to the collectors of transistors 39A, 39B of the AND-gates 14A, 14B. Under condition of zero error-signal, any pulses P produced by generator 16F are not passed by either of the AND-gates 14A, 14B because of absence of any signal on the other input circuits of the AND-gates; the oscillator 16F may be designed to produce no pulses for zero error-signal. In either case, when an appreciable error-signal exists, one or the other of AD-gates 14A, 14B, depending upon the polarity of the error-signal, passes output pulses (PF) to a corresponding one of the drivers 17A, 17B.

As shown in FIG. 3, the pulses PF passed by either of the selected AND-gates 14A, 14B are modulated both in amplitude and frequency. For an error-signal of small magnitude $E_1$, the pulses $PF_1$ are of low amplitude and of low repetition rate: for error-signals of increasingly greater magnitudes $E_2$ to $E_5$, the pulses $PF_2$–$PF_5$ of the corresponding pulse trains are of correspondingly greater amplitude and higher frequency.

The emitter of transistor 39A of AND-gate 14A is directly coupled to the base of transistor 50A of driver amplifier 17A. The collector of transistor 50A is connected to ground via resistor 51 and also to the base of power-stage transistor 52A. The emitter of power transistor 52A is connected to ground through the control winding 52 of motor 19. Specifically, for the particular type of DC motor shown, the winding 52 of the motor is the armature and the field-excitation may be provided by a permanent magnet 53, as shown, or by a continuously energized field winding. A split field motor may be used in which case the two fields are respectively in the collector-emitter circuits of the two-power transistors 52A, 52B, each in series with the armature winding to ground.

Power for operation of the system, including motor 19, may be provided by a suitable constant voltage DC source which is exemplified by battery 43 for simplicity of explanation. In the system shown, the power transistors are connected directly across the power supply. A non-polarized capacitor 56 of suitably high value, for example from 1 to 10 $\mu$f., may be connected across the motor 19 for filtering purposes.

When the error-signal is of polarity to activate the A-channel of the complete system for operation of the motor 19 in one direction, the signal input to the power transistor 52A and the power output delivered by that transistor to motor 19, or other load, is a series of pulses modulated both as to amplitude and frequency in accordance with the magnitude of the error-signal.

To provide for operation of motor 19 in the reverse sense when the error-signal is of opposite polarity, the driver amplifier 17B includes an inverter stage between AND-gate 14B and the transistor 50B which provides the driving pulses for transistor 52B. Specifically, the emitter of transistor 39B of AND-gate 14B is directly coupled to the base of transistor 55 of the inverter stage, and the collector of transistor 55 is connected via resistor 66 to the base of the driver transistor 50B. The collector of transistor 50B is connected to the base of power transistor 52B and to ground via resistor 51. The emitter of power transistor 52B is connected to ground through the control winding 52 of motor 19 and the collector of transistor 52B is connected to the negative ungrounded terminal of voltage source 43. Thus, when the error-signal is of such opposite polarity to activate the B-channel of the entire system, the signal input to the power transistor 52B and the power output delivered by that transistor to motor 19 is again a series of pulses modulated both as to amplitude and freqency in accordance with the magnitude of the error-signal. However, for error-signals of such reverse polarity, the polarity of the pulses delivered to motor 19 by power transistor 52B is reversed with respect to that of the pulses delivered to motor 19 by power transistor 52A.

The speed of motor 19 for error-signals of given magnitude, regardless of polarity, may be adjusted over a very wide range by adjustment of contact 42 of potentiometer 41 in the pulse-frequency modulating circuitry. With independent potentiometers 37A, 37B in the A and B channels of the pulse-amplitude modulation circuitry, the speeds of rotation of motor 19 for a given magnitude of error-signal may be made the same for both polarities of the error-signal so to compensate for sense-dependent friction in the rebalancing mechanism, or such speeds may be made suitably different to obtain different desired rebalancing rates.

Recorder 32 (FIG. 1) is provided with stops, such as stop pins 20H, 20L, to prevent further movement of the rebalancing system in the same direction when it has reached a limit corresponding with an end of the recorder chart 21. Consequently, if a large error-signal demands further movement in the prohibited direction, the high current output delivered by amplifier 18 to the now stalled motor 19 causes excessive overheating of the motor and may burn it out. Protective resistors may be used in the motor circuit, but this expedient undesirably reduces the maximum power which can be delivered to the motor for normal balancing operation; also, the heat from such resistors may injure and/or cause destruction of amplifier components, particularly transistors.

These problems and disadvantages can be overcome by substituting for the simple two-diode OR-gate 15 of FIG. 2 the somewhat more complex OR-gate 15M of FIG. 4. In this OR-gate circuit, the anodes of the diodes 40A, 40B are individually connected to the base of input transistor 45 of oscillator 16F via the resistors 60A, 60B respectively and are connected to each other by the RC network comprising capacitor 61 and resistor 62 in series. The anodes of diodes 40A, 40B are also connected to ground via diodes 63A, 63B respectively. Suitable values for the components of this OR-circuit are: resistors 60A, 60B—39 kilohms; capacitor 51—20 $\mu$f.; resistor 62—1 kilohm.

With the rebalancing mechanism stalled against either stop, the capacitor 61 charges up almost to full supply voltage in a short time, for example, two seconds. This effectively reduces the error-signal as applied to generator 16F with consequent reduction of its pulse rate, by as much as five times, with corresponding reduction of the stall current of the motor to safe low value. When the error-signal next reverses in polarity, the opposite one of transistors 36A, 36B at once becomes full-ON to effect high pulse rate of generator 16F and rapidly discharge capacitor 61. Accordingly, the balancing mechanism moves away from the stop, initially at high rate, and then as the capacitor 61 discharges, at rate corresponding with the magnitude of the existing error-signal.

Specifically, if the rebalancing mechanism has been driven against a stop by signals in channel A, the capacitor 61 is charged by current-flow in the path including resistors 41, 42, 60B and 62. Thus, the voltage at point 65A rises to that of point 13C and so effectively reduces the error-signal as applied to the base of input transistor 45 of pulse generator 16F. When the error-signal next reverses in polarity, the capacitor 61 discharges rapidly (in about 22 milliseconds) in the path including resistor 62, diode 40B, the now full-ON transistor 36B and diode 63A. Thereafter, the system operation continues in normal fashion previously described.

Except for differences below discussed, the pulsed power amplifier system shown in FIG. 5 is essentially the same as that shown in FIG. 2. The corresponding elements of both systems are identified by the same reference characters so that it is unnecessary to repeat much of the circuit description.

As in FIG. 2, the bases of the transistors 39A, 39B of AND-gates 14A, 14B are respectively connected to the output or collector circuits of the third stage transistors 36A, 36B of differential amplifier 12 to provide amplitude-modulation of the error-signal pulses delivered to one or the other of drivers 17A, 17B, depending upon the polarity of the error-signal. In FIG. 5, however, the interrogating pulses supplied to the collectors of the AND-gate transistors 39A, 39B are width-modulated by the amplified error-signal rather than frequency-modulated as in FIG. 2.

Specifically in FIG. 5, the pulse generator 16W includes a magnetic multiplier 70 whose saturable core 71 is provided with a plurality of windings including the input winding 72. One terminal of winding 72 is connected to potentiometer 41, 42, in the output circuit of the OR-gate 15 (15M), and the other terminal of winding 72 is connected to ground via a periodically-closed switch.

More particularly, the winding 72 is connected in the output or collector-emitter circuit of switching transistor 73 and the voltage on the base of transistor 73 is pulsed at constant frequency from a suitable source $V_4$. Thus, during one-half of each cycle of switching voltage $V_4$, a current pulse traverses the winding 72 and sets the core 71. The extent to which the core 71 is driven from saturation in one sense toward saturation in the opposite sense depends upon the magnitude of the error-signal as appearing at output terminal 13C to the OR-circuit 15 (or 15M).

During the second half of each cycle of the switching voltage $V_4$, the core is reset to its original saturation state. Resetting of the core results from energization of core winding 74 via a periodically-operated switch. Specifically, in the magnetic multiplier shown, the core reset winding 74 is connected in series with one section of the power supply 43 and the emitter-collector circuit of transistor 75. The reset transistor 75 is turned ON as the set transistor 73 is turned OFF. In the regenerative reset type of multiplier shown, a core winding 76 is connected in the input or base-emitter circuit of the reset transistor 75. The pulse induced in winding 76 when transistor 73 is switched OFF is of proper polarity to switch transistor 75 to conductive state. The resulting current-flow in reset winding 74 terminates when the core 71 returns to its original state. In consequence, the duration or width of the reset pulse is proportional to the amplitude of the error-signal as appearing at output terminal 13C of the OR-gate 15 (or 15M).

The output winding 77 of core 71 is in the input or base-emitter circuit of the output transistor 78 of pulse generator 16W. During resetting of the core, the transistor 78 is switched ON by the signal induced in the output winding 77 to produce a current pulse P of fixed amplitude, fixed-repetition frequency and of duration proportional to the magnitude of the error-signal E.

Thus, for an error-signal of either polarity, a corresponding one of the AND-gates 14A, 14B delivers to the associated driver 17A, 17B a series of control pulses PW which are both amplitude-modulated and width-modulated in accordance with the magnitude of the error-signal. As shown in FIG. 6, for an error-signal of small magnitude $E_1$, the constant frequency pulses $PW_1$ are of low amplitude and short duration: for error-signals of increasingly greater magnitudes $E_2$ to $E_5$; the pulses $PW_2$–$PW_5$ of the corresponding pulse trains are of increasingly greater amplitudes and of increasingly greater duration.

Again as in FIG. 2, it is significant that for all levels of error-signal, the power amplifier 18 is not required to dissipate substantial amounts of power. At high levels of error-signal, the active amplifier output stage 52A or 52B is in fully-ON state for a long-duty cycle because of the wide pulses PW: at somewhat lower levels of error-signal, the active output stage is in fully-ON state but for a shorter-duty cycle because of somewhat narrower pulses PW; at still lower levels of error-signal, the active power stage is only partially ON and for a still shorter duty cycle. At preselected minimum level of error-signal, the amplifier output stage is completely OFF because although pulse generator 16W may still apply interrogating pulses to one of the AND-gates, the error signal applied to the other input of the selected AND-gate is below its threshold level. This establishes a narrow deadband within which both output channels of the power amplifier 18 are completely OFF for subminimal error-signals of either polarity.

In FIG. 5, the power supply for the driver transistors 50A, 50B and the power-output transistors 52A, 52B may be an unfiltered center tapped AC source with rectifiers to provide the respective channels with half-wave voltages of opposite polarity. In consequence, the waveform of the current pulses to the control winding of the motor, as controlled by the output from one or the other of the AND-gates 14A, 14B, will be of amplitude and width dependent upon the magnitude of the error-signal and of polarity dependent upon the polarity of the error-signal.

Although the high-power DC amplifier systems above described are particularly suited for supplying the excitation of the rebalancing motor of a recorder or recorder controller, they are also suited for other control purposes, for example, for supplying the excitation of a group of directional relays having progressively different pull-in points for stepped control applications in which a transducer network producing the error-signal responds to a variable control by the relays.

It will be understood the invention is not limited to the particular systems shown but comprehends modifications and equivalents thereof within the scope of the appended claims.

What is claimed is:

1. A power-amplifier system for excitation of a load in dependence upon the magnitude of a DC error-signal comprising pulse-generating means having an input circuit to which the error-signal is applied and producing output pulses one of whose characteristics frequency and width is a function of the magnitude of the applied error-signal, and AND-gate having one input enabled by the output pulses of said pulse-generating means and another input enabled by the error-signal to extent dependent upon the magnitude thereof, and a power-amplifier having an input circuit excited via said AND-gate to minimize the power-dissipation in said power-amplifier and to deliver to the load current pulses whose amplitude and the ratio of whose ON-OFF times both depend upon the magitude of the error-signal.

2. A power-amplifier system for excitation of a load in dependence upon the polarity and magnitude of a DC error-signal comprising pulse-generating means having an input circuit to which the error-signal is applied and producing output pulses one of whose characteristics frequency and width is a function of the magnitude of the applied error-signal, AND-gate means including a pair of AND-gates each having one input enabled by the output pulses of said pulse-generating means and whose other inputs are selectively enabled by the error-signal in dependence upon its polarity and to extent dependent upon the magnitude of the error-signal, and a dual-channel power-amplifier having two input channels respectively excited via said AND-gates to minimize the power-dissipation in said power amplifier and to deliver to the load DC current pulses whose polarity depends upon the polarity of the error-signal, whose amplitude depends upon the magnitude of the error-signal, and whose ON-OFF time-ratio depends upon the magnitude of the error signal.

3. A DC power-amplifier system for DC excitation of a load in dependence upon the polarity and magnitude of a DC error-signal comprising a differential DC amplifier having a differential input circuit to which the error-signal is applied and having a pair of output terminals at one or the other of which the amplified error-signal appears depending upon the polarity of the applied error-signal, a pair of AND-gates each having an input circuit connected to a corresponding one of the output terminals of said differential amplifier, an OR-gate having its inputs connected to said pair of output terminals of the differential amplifier, pulse-generating means having an input circuit to which the output of said OR-gate is applied and producing output pulses applied to another input circuit of both AND-gates, the frequency/width characteristic of said output pulses varying in accordance with the magnitude of the error-signal, and a dual-channel power-amplifier having two input channels respectively excited via said AND-gates to minimize the power-dissipation in said power-amplifier and to deliver to the load DC pulses whose polarity depends upon the polarity of the error-signal, whose amplitude depends upon the magnitude of the error-signal, and the ratio of whose ON-OFF times depends upon the magnitude of the error-signal.

4. A DC power-amplifier system responsive to a DC error-signal of reversible polarity and of variable magnitude to provide DC excitation for the reversible rebalancing motor of a balanceable network producing the error-signal comprising a differential DC amplifier having a differential input circuit to which the error-signal is applied and having a pair of output terminals at one or the other of which the amplified error-signal appears depending upon the polarity of the applied error-signal, a pair of AND-gates each having an input circuit connected to a corresponding one of the output terminals of said differential amplifier, an OR-gate having its inputs connected to said pair of output terminals of the differential amplifier, pulse-generating means having an input circuit to which the output of said OR-gate is applied and producing output pulses applied to another input circuit of both AND-gates, the frequency/width characteristic of said output pulses varying in accordance with the magnitude of the error-signal, and a dual-channel power-amplifier having two input circuits respectively excited via said AND-gates to minimize the power-dissipation in said power-amplifier and to deliver to the motor DC pulses whose polarity depends upon the polarity of the error-signal, whose amplitude depends upon the magnitude of the error-signal, and the ratio of whose ON-OFF times depends upon the magnitude of the error-signal, said OR-gate including an RC network whose capacitor is charged upon stalling of the motor at a limit of its travel, effectively to reduce the averaged value of the current pulses delivered to it by said power-amplifier in response to error-signals of one polarity, and including diodes for discharging said capacitor upon reversal of polarity of the error signal.

5. A DC power-amplifier system for DC excitation of a load in dependence upon the magnitude of a DC error-signal comprising pulse-generating means having an input circuit to which the error-signal is applied and producing output pulses whose frequency varies in accordance with the magnitude of the applied error-signal, an AND-gate having one input circuit enabled by the output pulses of said pulse-generating means and another input circuit enabled by the error-signal to extent dependent upon the magnitude thereof, and a power-amplifier having an input circuit excited via said AND-gate to minimize the power-dissipation in said power-amplifier and to deliver to the load current pulses whose amplitude and frequency both depend upon the magnitude of the error-signal.

6. A power-amplifier system as in claim 5 in which the pulse-generating means comprises an oscillator including a unijunction transistor having its output connected to said one input circuit of the AND-gate and having a capacitor in its emitter circuit, and a current-transistor whose output circuit supplies current to said capacitor and the emitter of said unijunction transistor, the magnitude of said current being dependent upon that of the error-signal applied to the base of said current-transistor and so determining the frequency of the output pulses of the oscillator.

7. A DC power-amplifier system for DC excitation of a load in dependence upon the polarity and magnitude of a DC error-signal comprising pulse-generating means having an input circuit to which the error-signal is applied and producing output pulses whose frequency is a function of the magnitude of the applied error-signal, AND-gate means including a pair of AND-gates each having one input enabled by the output pulses of said pulse-generating means and whose other inputs are selectively enabled by the error-signal in dependence upon its polarity and to extent dependent upon the magnitude of the error-signal, and a dual-channel power-amplifier having two input channels respectively excited via said AND-gates to minimize the power-dissipation in said power-amplifier and to deliver to the load DC current pulses whose polarity depends upon the polarity of the error-signal, whose amplitude depends upon the magnitude of the error-signal, and whose frequency depends upon the magnitude of the error-signal.

8. A DC power-amplifier system for DC excitation of a load in dependence upon the polarity and magnitude of a DC error-signal comprising a differential DC amplifier having a differential input circuit to which the error-signal is applied and having a pair of output terminals at one or the other of which the amplified eror-signal appears depending upon the polarity of the applied error-signal, a pair of AND-gates each having an input circuit connected to a corresponding one of the output terminals of said differential amplifier, an OR-gate having its inputs connected to said pair of output terminals of the differential amplifier, pulse-generating means having an input circuit to which the output of said OR-gate is applied and producing output pulses applied to another input circuit of both AND-gates, the frequency of said output pulses varying in accordance with the magnitude of the error-signal, and a dual-channel power-amplifier having two input channels respectively excited via said AND-gates to minimize the power-dissipation in said power-amplifier and to deliver to the load DC pulses whose polarity depends upon the polarity of the error-signal, whose amplitude depends upon the magnitude of the error-signal, and whose frequency depends upon the magnitude of the error-signal.

9. A DC power-amplifier system responsive to a DC error-signal of reversible polarity and of variable magnitude to provide DC excitation for the reversible rebalancing motor of a balanceable network producing the error-signal comprising a differential DC amplifier having a differential input circuit to which the error-signal is applied and having a pair of output terminals at one or the other of which the amplified error-signal appears depending upon the polarity of the applied error-signal, a pair of AND-gates each having an input circuit connected to a correspondnig one of the output terminals of said differential amplifier, an OR-gate having its inputs connected to said pair of output terminals of the differential amplifier, pulse-generating means having an input circuit to which the output of said OR-gate is applied and producing output pulses applied to another input circuit of both AND-gates, the frequency of said output pulses varying in accordance with the magnitude of the error-signal, and a dual-channel power-amplifier having two input circuits respectively excited via said AND-gates to minimize the power-dissipation in said power-amplifier and to deliver to the motor DC pulses whose polarity depends upon the polarity of the error-signal, whose amplitude depends upon the magnitude of the error-signal, and whose frequency depends upon the magnitude of the error-signal.

said OR-gate including an RC network whose capacitor is charged upon stalling of the motor at a limit of its travel, effectively to reduce the averaged value of the current pulses delivered to it by said power-amplifier in response to error-signals of one polarity, and including diodes for discharging said capacitor upon reversal of polarity of the error-signal.

References Cited

UNITED STATES PATENTS 3,226,565 12/1965 Earle ______________ 307—218
3,231,824 1/1966 Drapkin _________ 307—265 X JOHN KOMINSKI, *Primary Examiner.*

NATHAN KAUFMAN, *Examiner.*

UNITED STATES PATENT OFFICE

CERTIFICATE OF CORRECTION

Patent No. 3,384,833

May 21, 1968

James J. Hitt

It is certified that error appears in the above identified patent and that said Letters Patent are hereby corrected as shown below:

Column 1, line 9, "follower-up" should read -- follow-up --. Column 2, line 37, "exited" should read -- excited --; line 39, "drive" should read -- driver --. Column 4, line 10, "AD-gates" should read -- AND-gates --; line 31, after "used" insert a comma. Column 5, line 38, "capacitor 51" should read -- capacitor 61 --. Column 7, line 37, "and" should read -- an --. Column 9, line 38, "eror-signal" should read -- error-signal --.

Signed and sealed this 16th day of December 1969.

SEAL)

ttest:

dward M. Fletcher, Jr.

ttesting Officer

WILLIAM E. SCHUYLER, JR.

Commissioner of Patents